(12) United States Patent
Li

(10) Patent No.: US 9,468,860 B2
(45) Date of Patent: Oct. 18, 2016

(54) SYSTEM AND METHOD FOR INTEGRATING DIGITAL BACKGROUND WITH STAGE PERFORMANCE

(71) Applicant: Hongzhi Li, Cuddebackville, NY (US)

(72) Inventor: Hongzhi Li, Cuddebackville, NY (US)

( * ) Notice: Subject to any disclaimer, the term of this patent is extended or adjusted under 35 U.S.C. 154(b) by 286 days.

(21) Appl. No.: 14/202,874

(22) Filed: Mar. 10, 2014

(65) Prior Publication Data
US 2014/0357386 A1  Dec. 4, 2014

Related U.S. Application Data

(62) Division of application No. 13/470,444, filed on May 14, 2012, now abandoned.

(60) Provisional application No. 61/508,016, filed on Jul. 14, 2011.

(51) Int. Cl.
*A63J 5/02* (2006.01)

(52) U.S. Cl.
CPC .. *A63J 5/021* (2013.01); *A63J 5/02* (2013.01)

(58) Field of Classification Search
CPC .................. A63J 5/00; A63J 2005/001; A63J 2005/002; A63J 2005/021
See application file for complete search history.

(56) References Cited

U.S. PATENT DOCUMENTS

| | | | | |
|---|---|---|---|---|
| 5,061,061 A | * | 10/1991 | Robley | G03B 15/10 352/47 |
| 5,528,425 A | * | 6/1996 | Beaver | A63J 5/021 352/85 |
| 5,790,124 A | * | 8/1998 | Fischer | G06T 15/10 345/473 |
| 7,876,331 B2 | * | 1/2011 | Rackham | A63J 1/00 345/170 |
| 2011/0285854 A1 | * | 11/2011 | LaDuke | G01S 11/00 348/169 |

* cited by examiner

*Primary Examiner* — William C Dowling
(74) *Attorney, Agent, or Firm* — Todd L. Sladek

(57) ABSTRACT

Disclosed are systems and methods for expanding the apparent range of movement of actors during a stage performance, from a stage platform to a background display, or from a background display to a stage platform. The appearance of the live actors on the stage platform and images of the live actors on the background display is the same. Timing, location and movement of the live actors on the stage platform is integrated with images of the actors on the background display. The integration of the live actors and images appears to an audience that an actor has moved from stage platform to the background display, or from the background display to the stage platform.

19 Claims, 20 Drawing Sheets

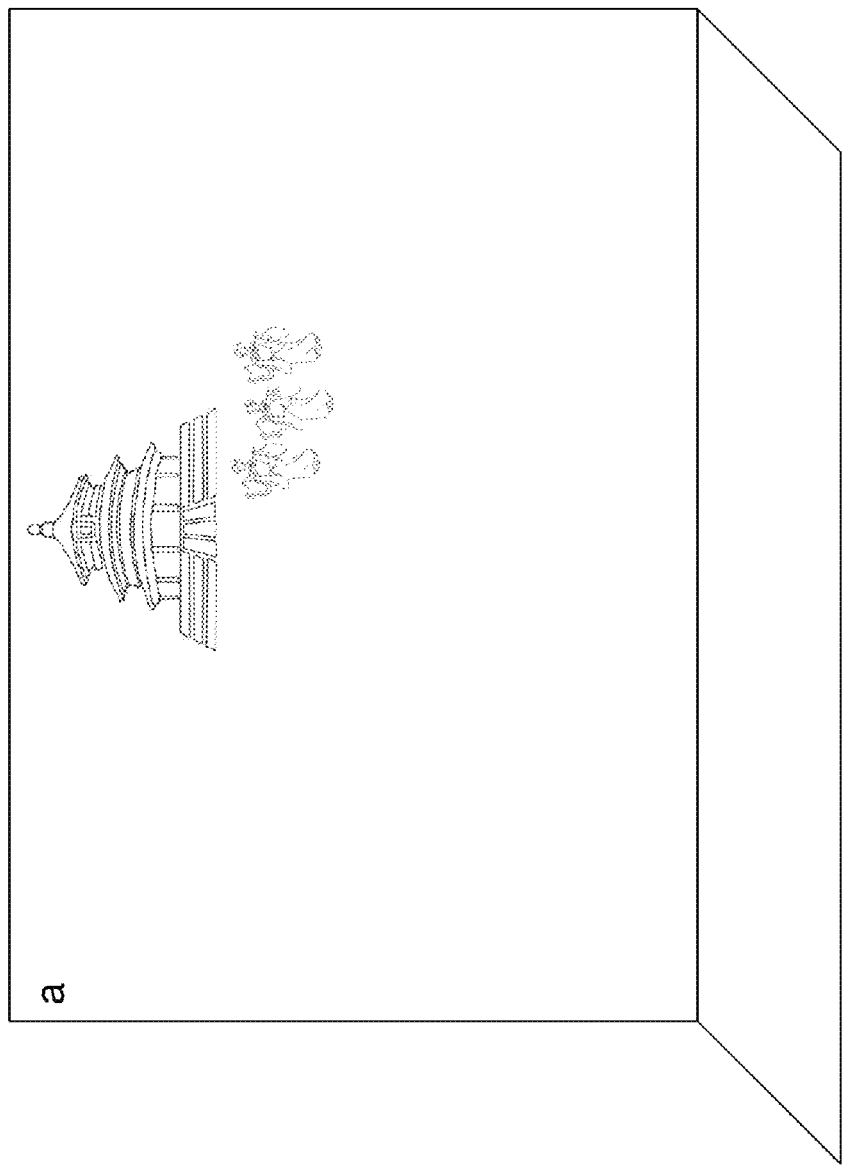

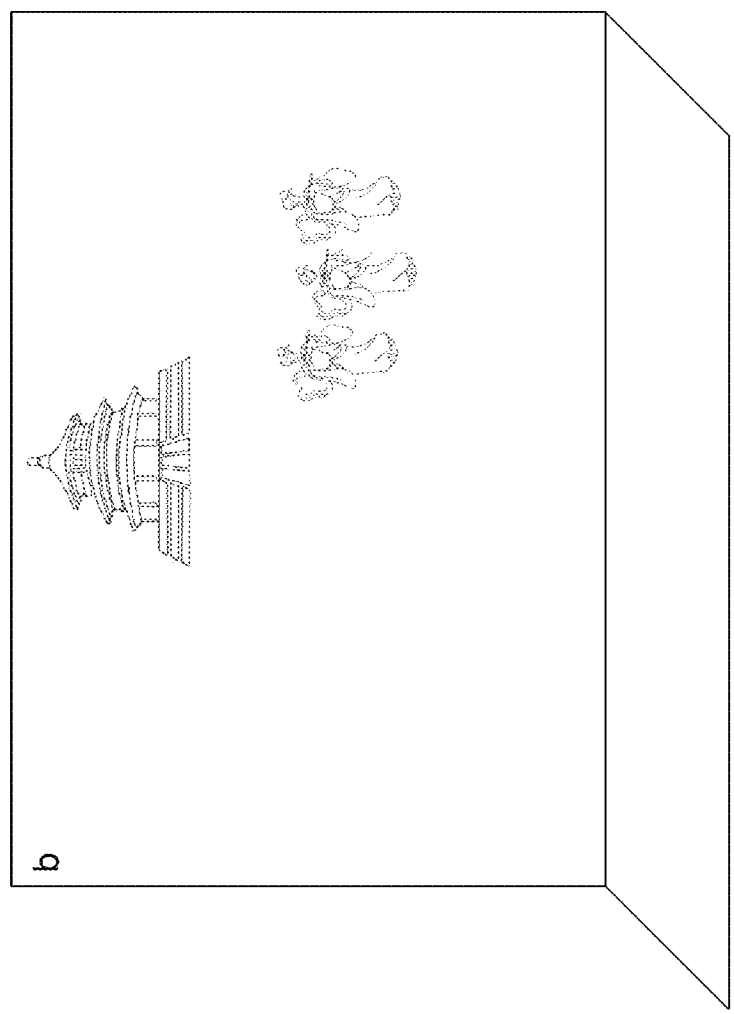

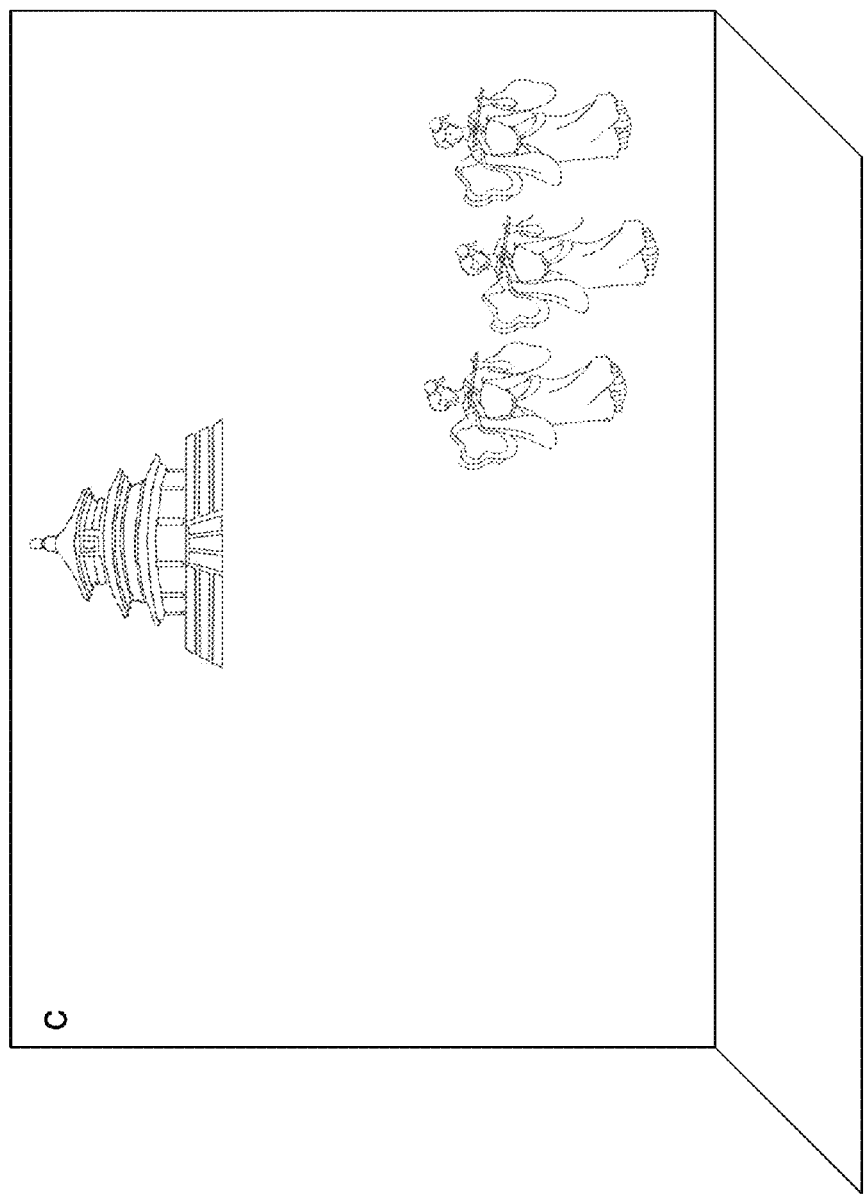
Figure 1c of 3

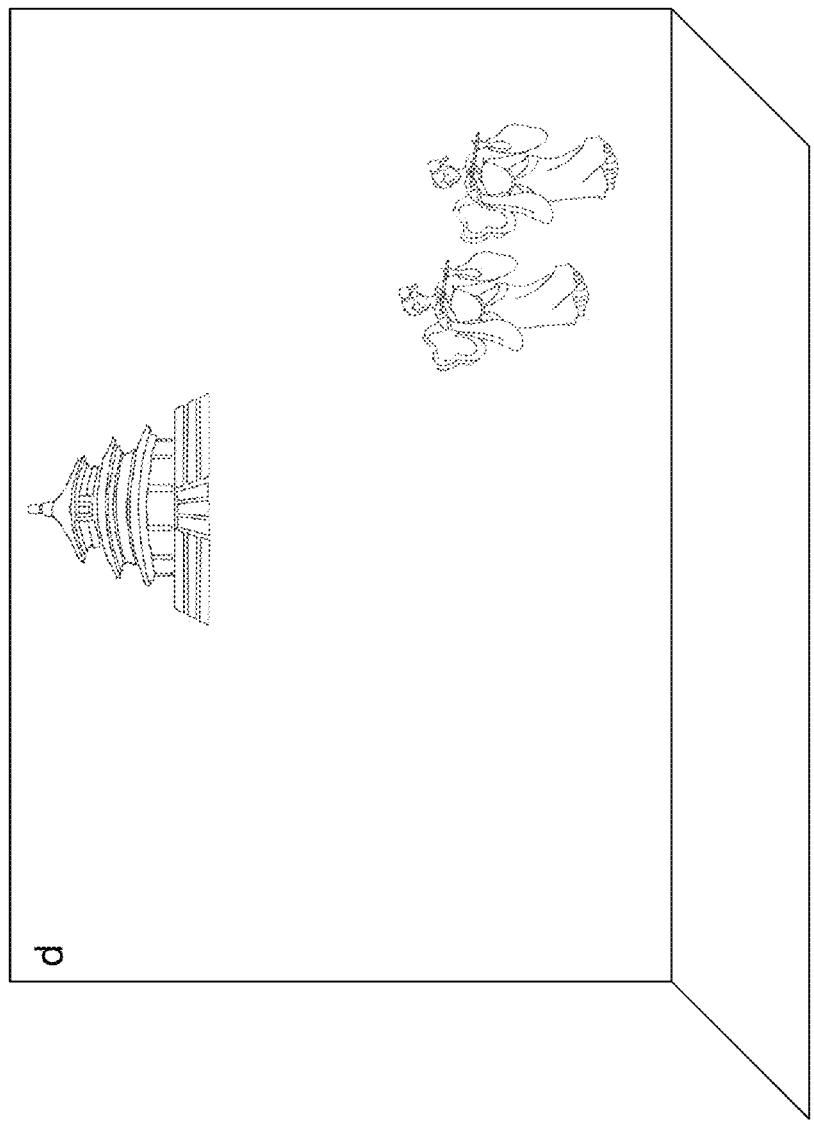

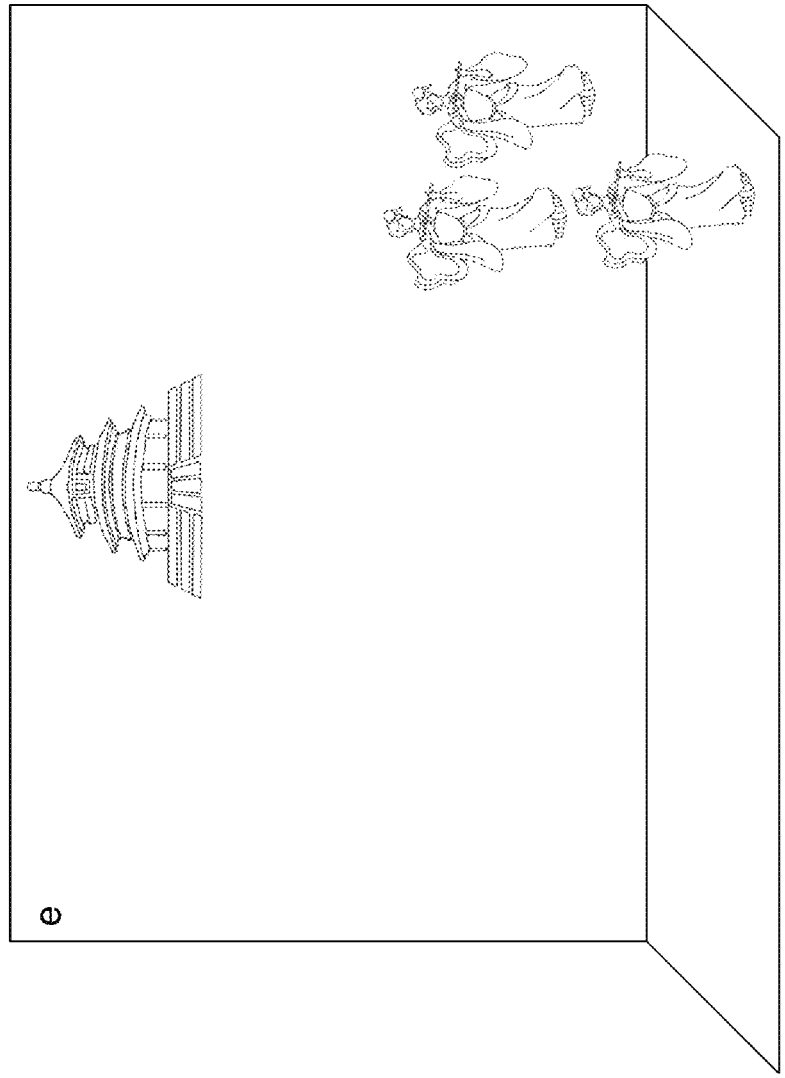

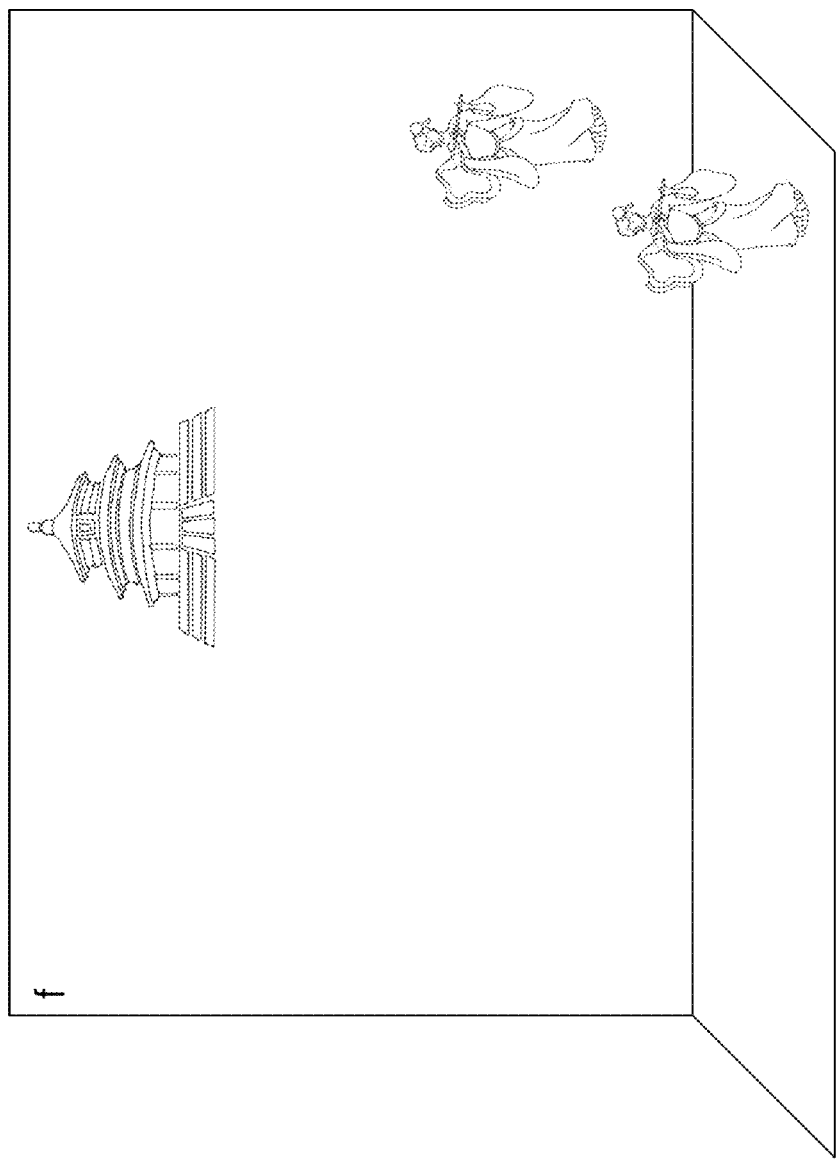
Figure 1f of 3

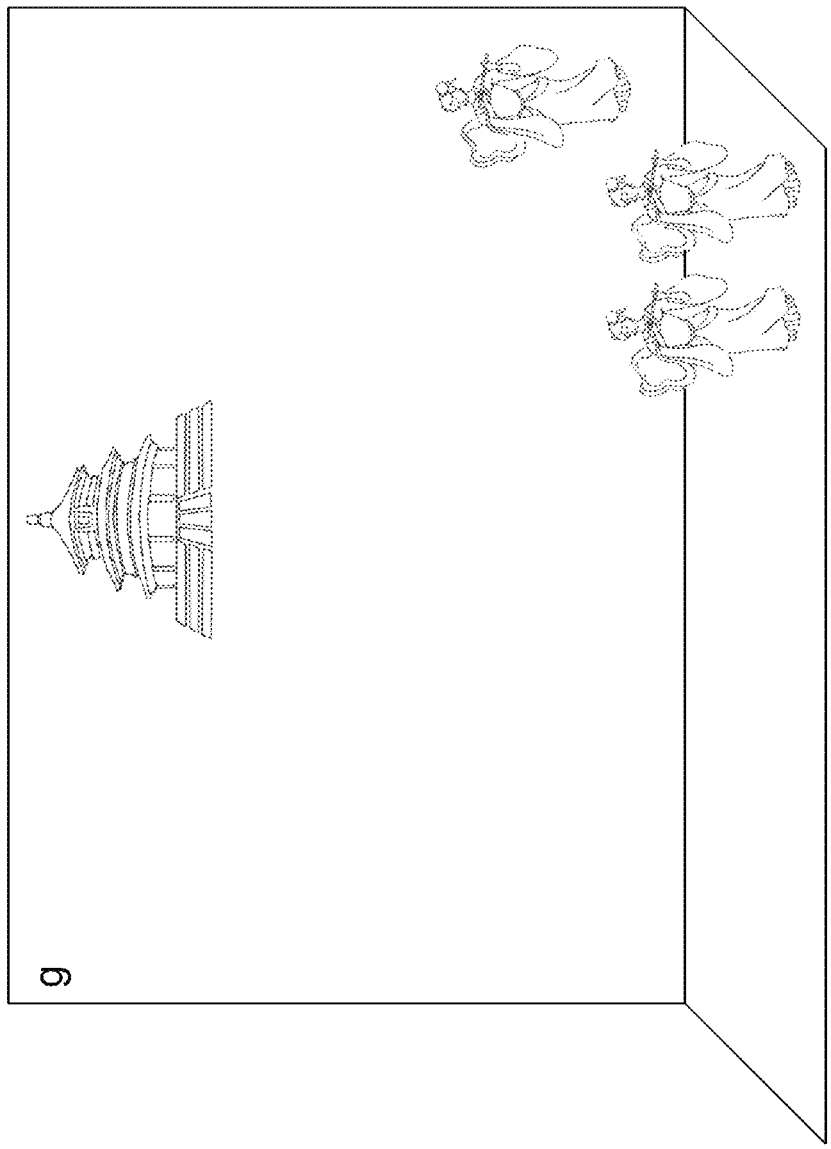

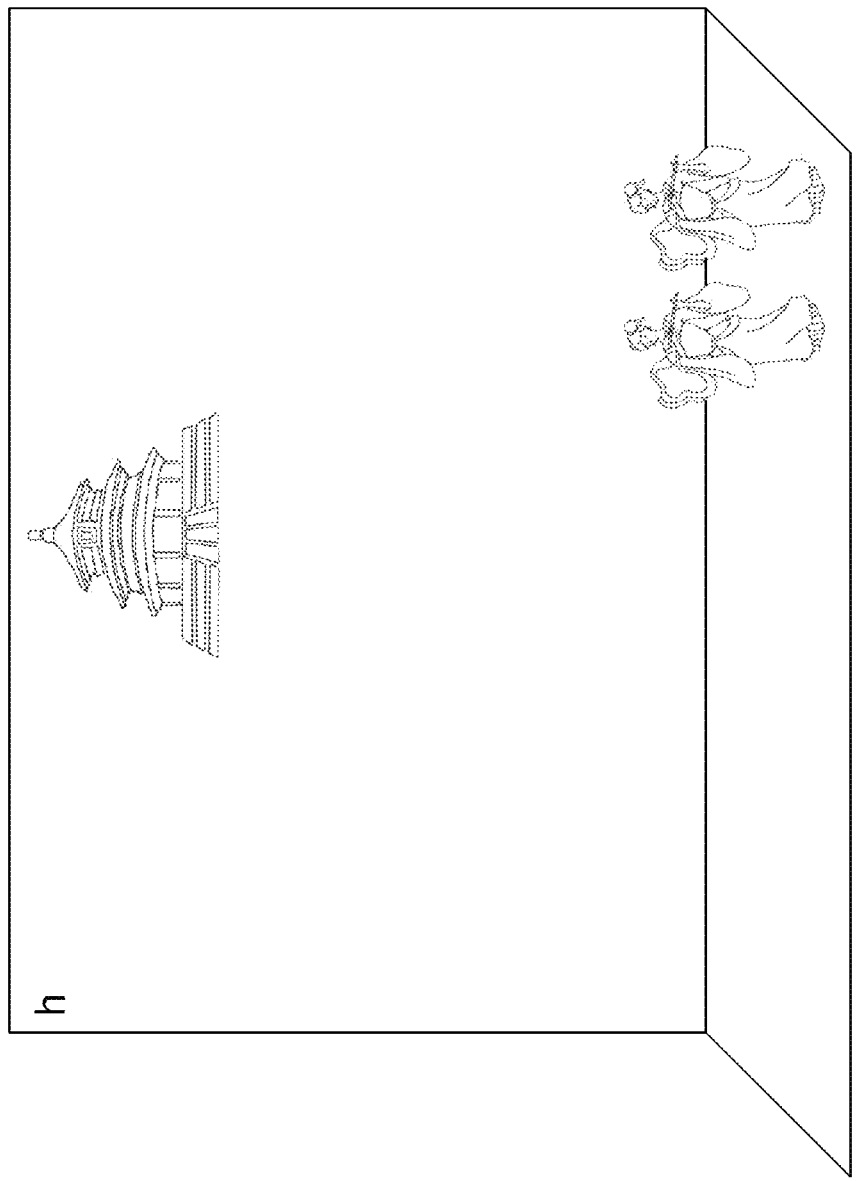
Figure 1h of 3

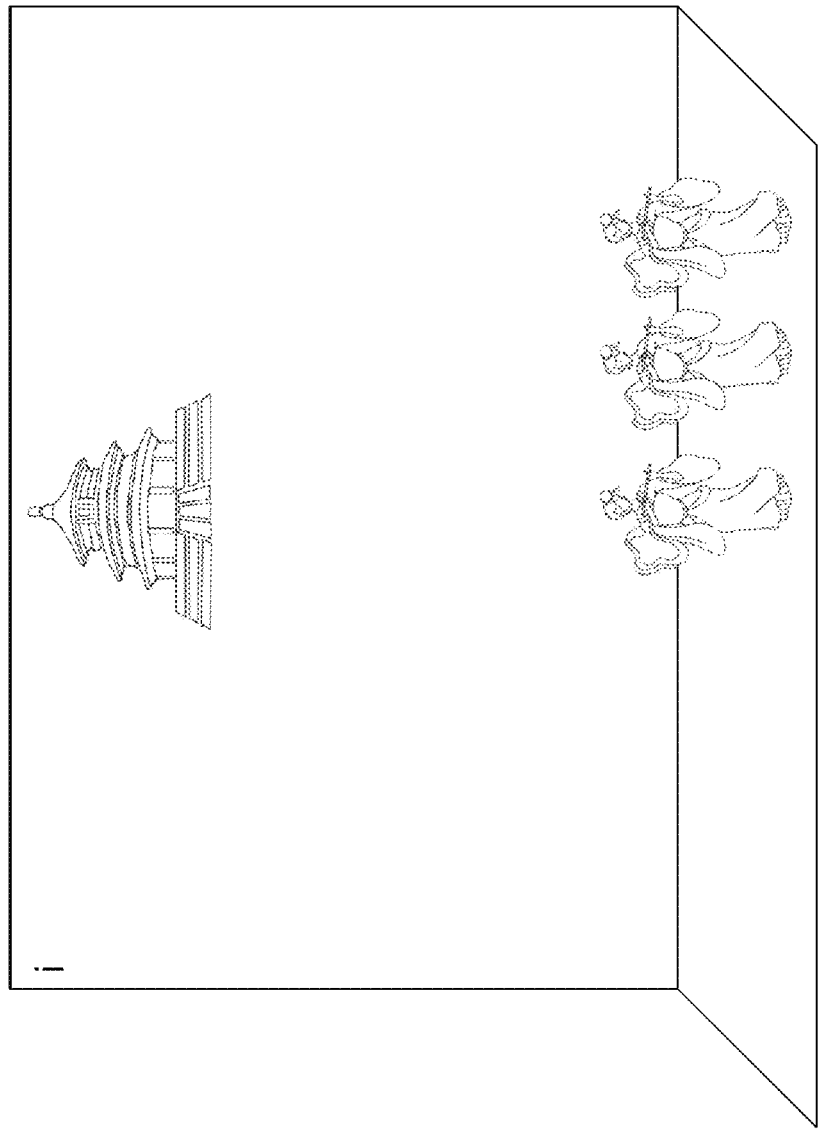
Figure 1i of 3

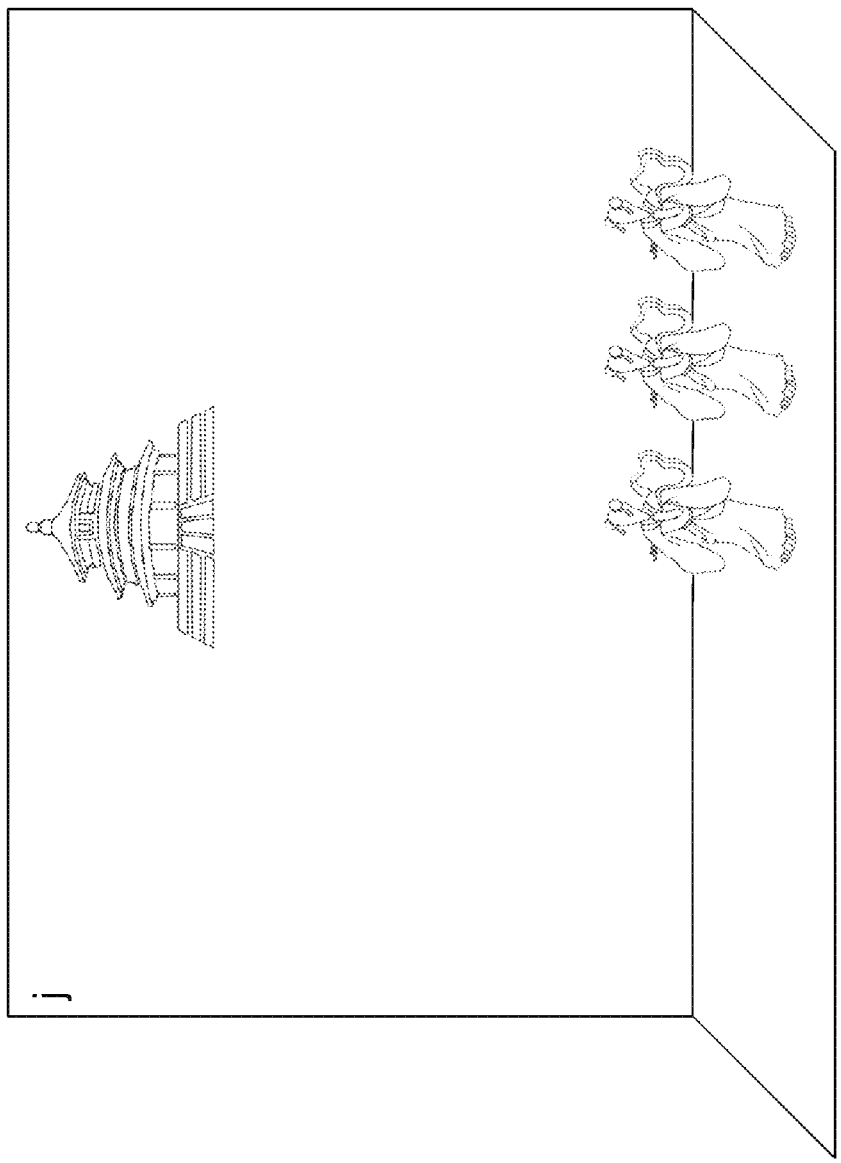
Figure 1j of 3

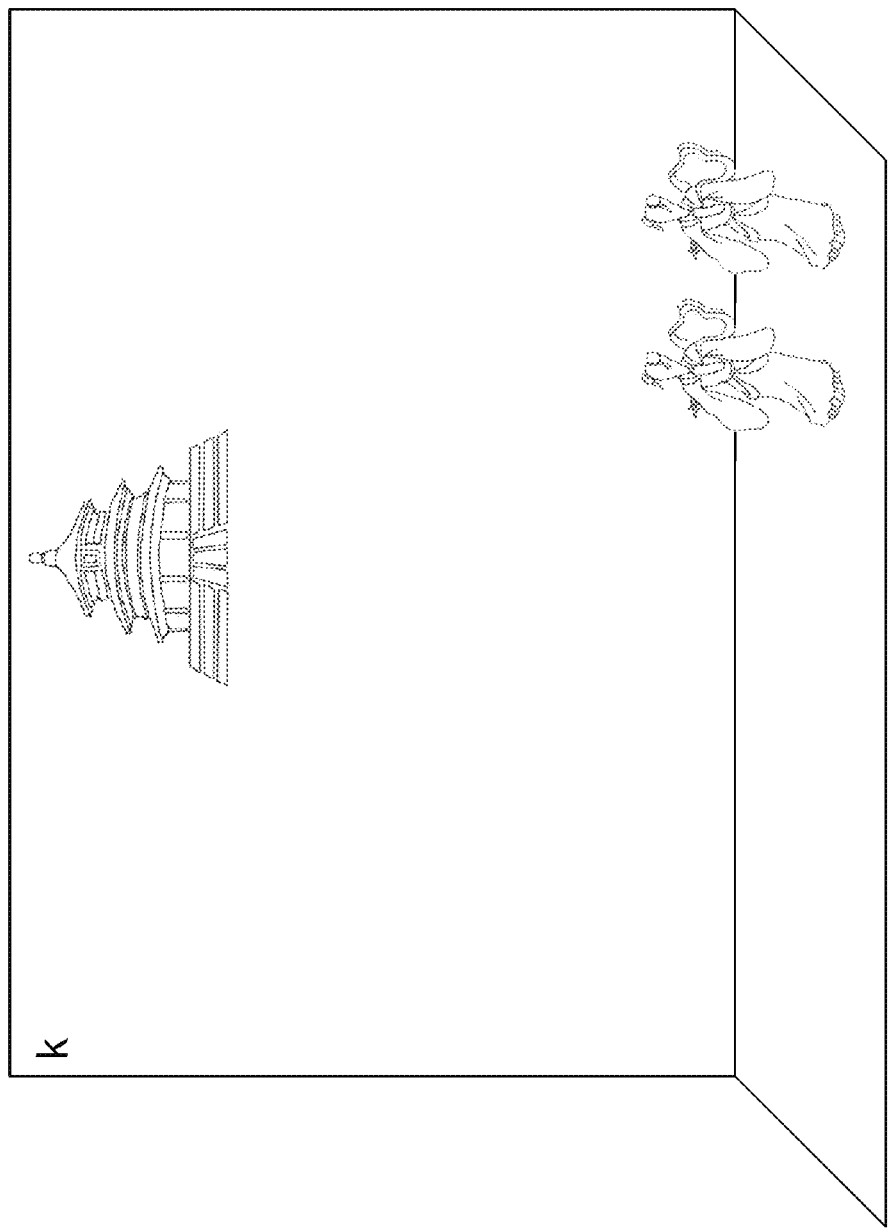
Figure 1k of 3

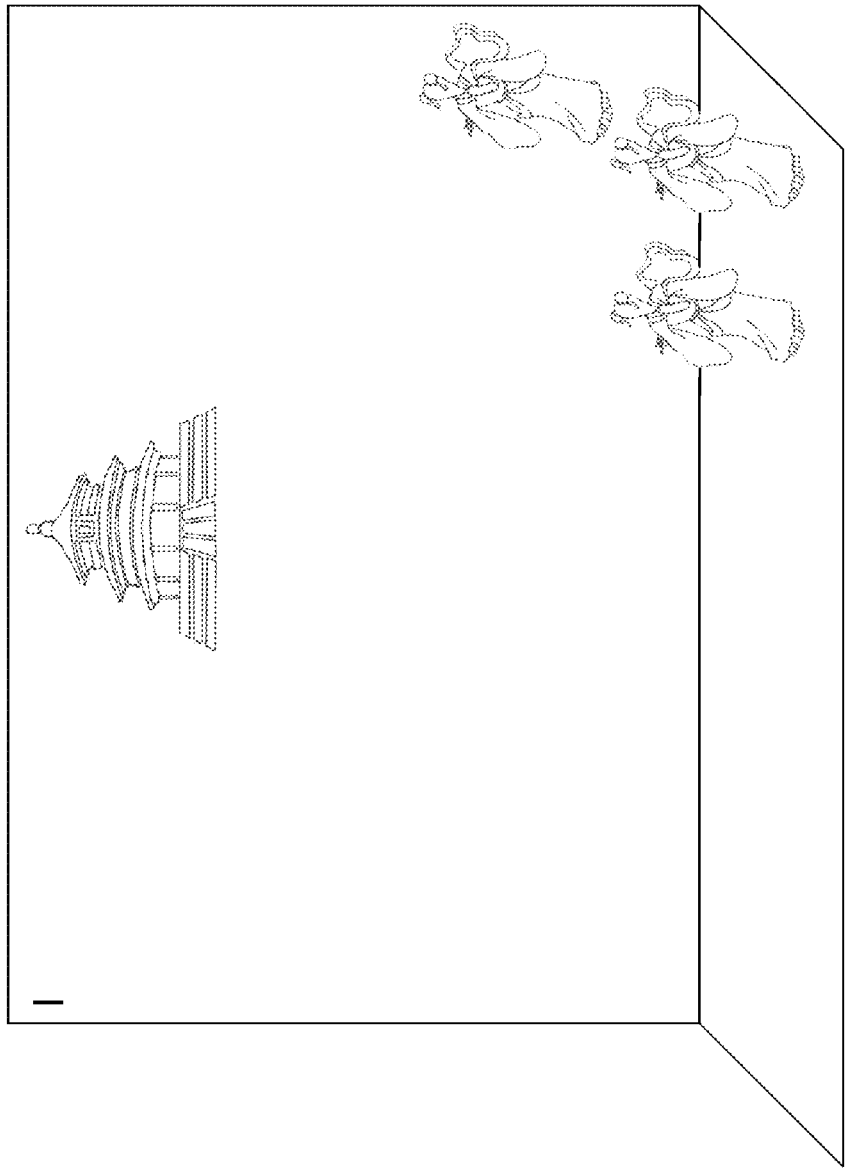

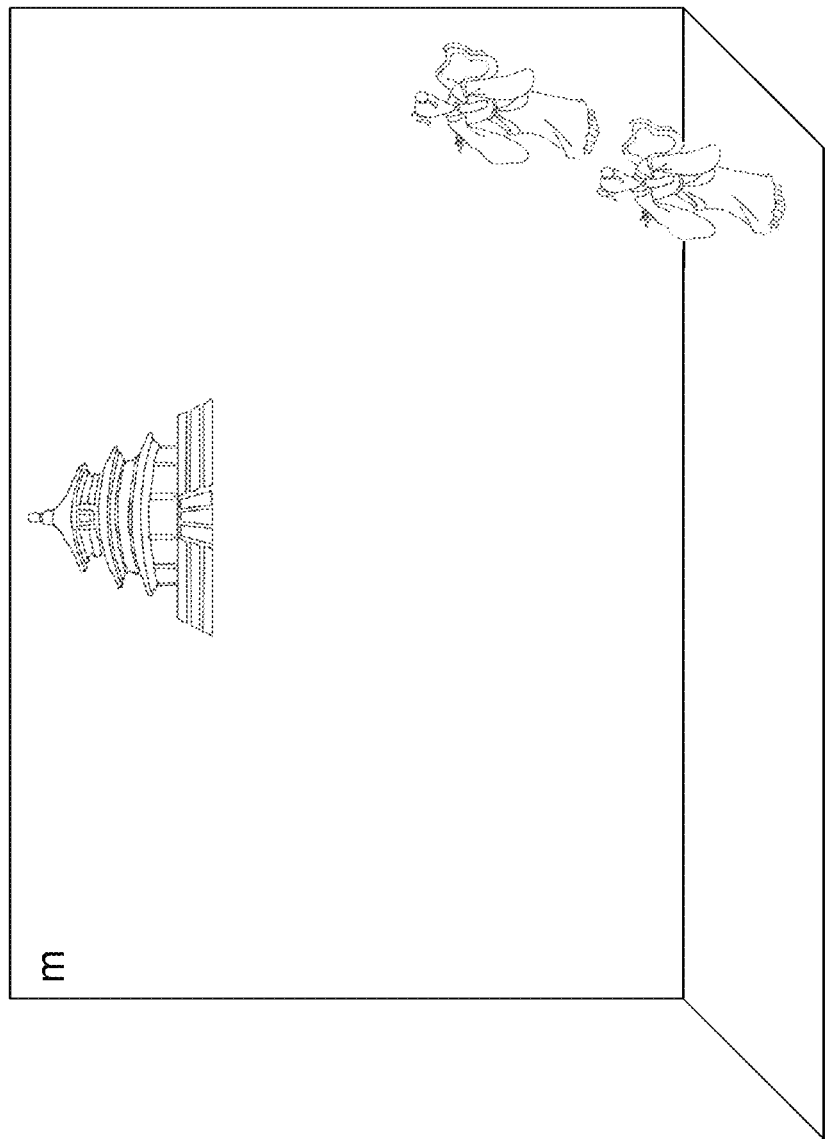

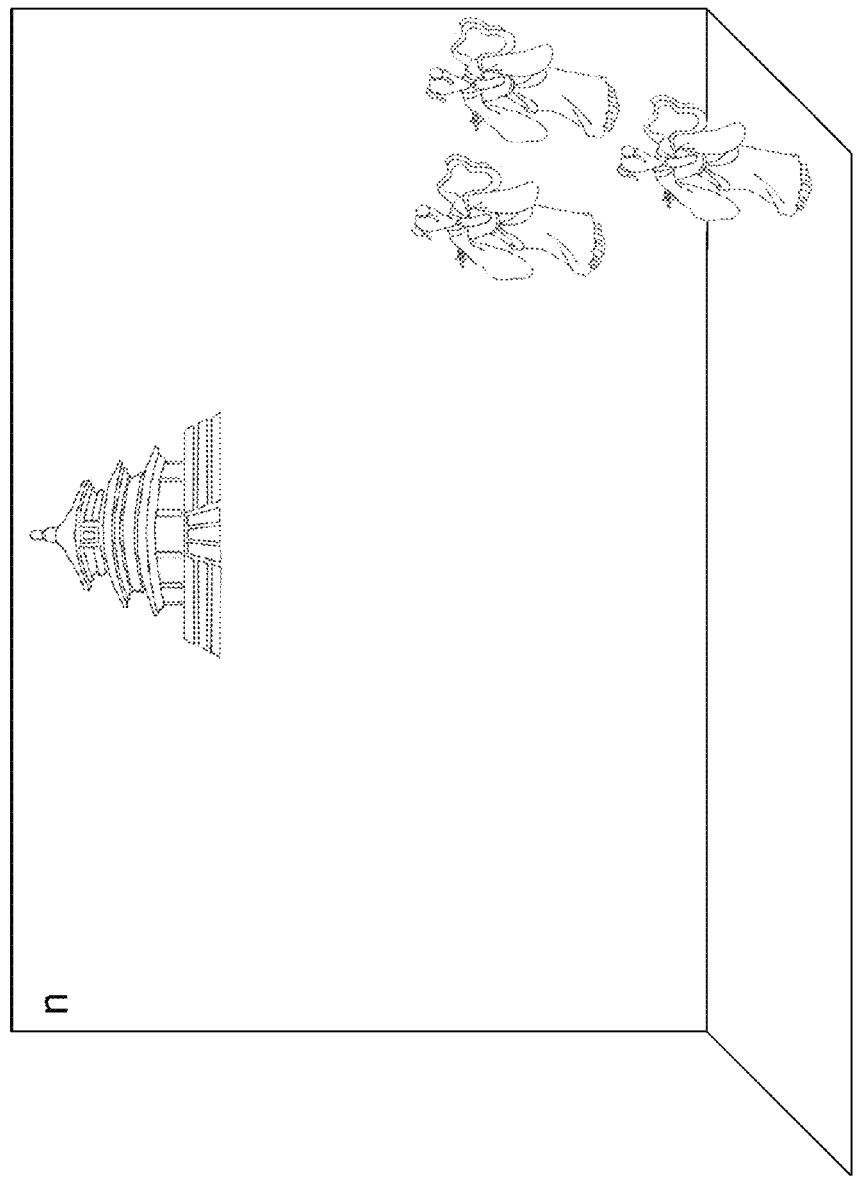

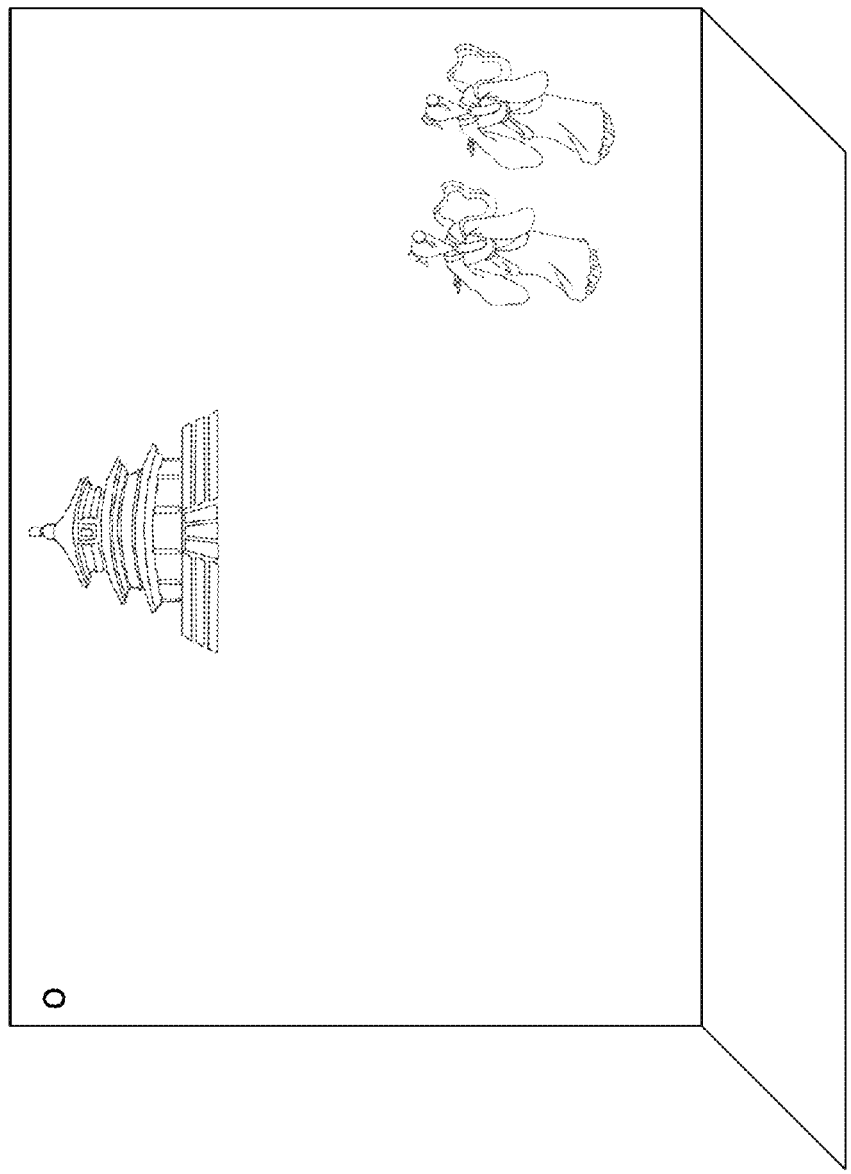
Figure 1o of 3

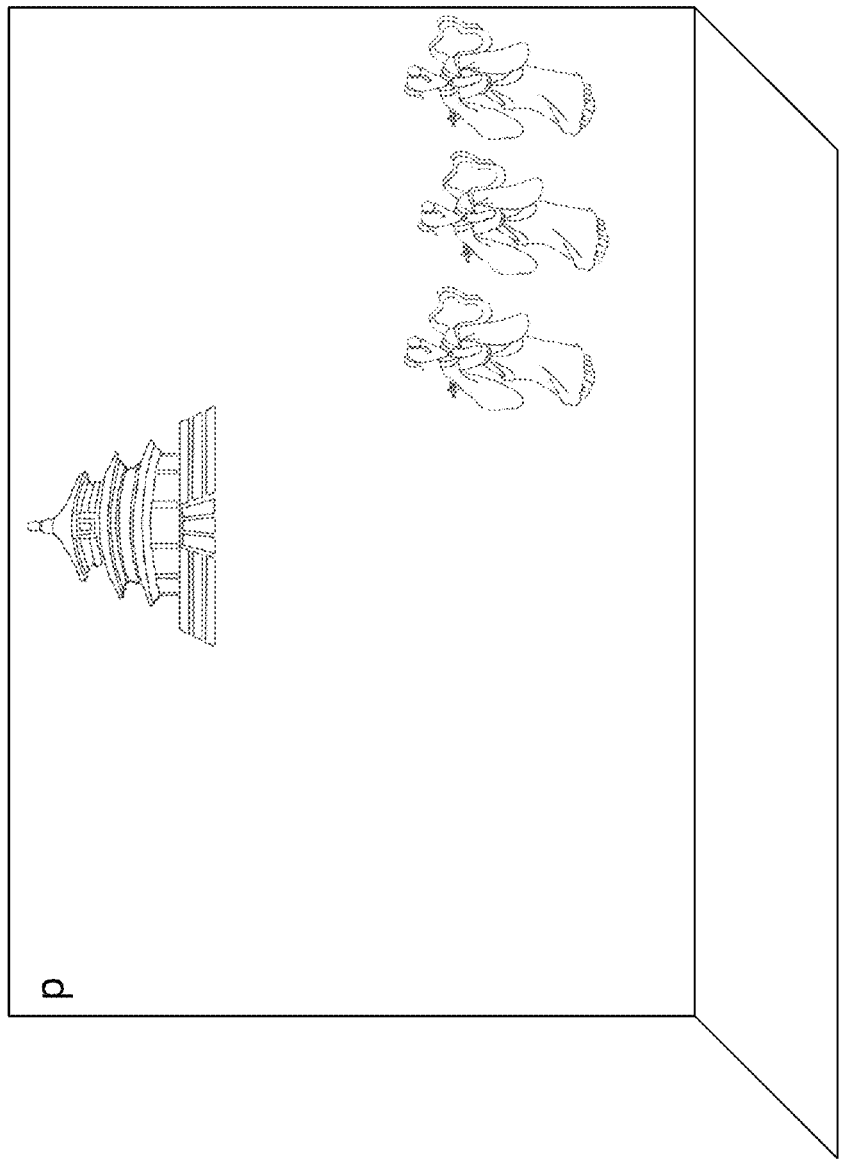
Figure 1p of 3

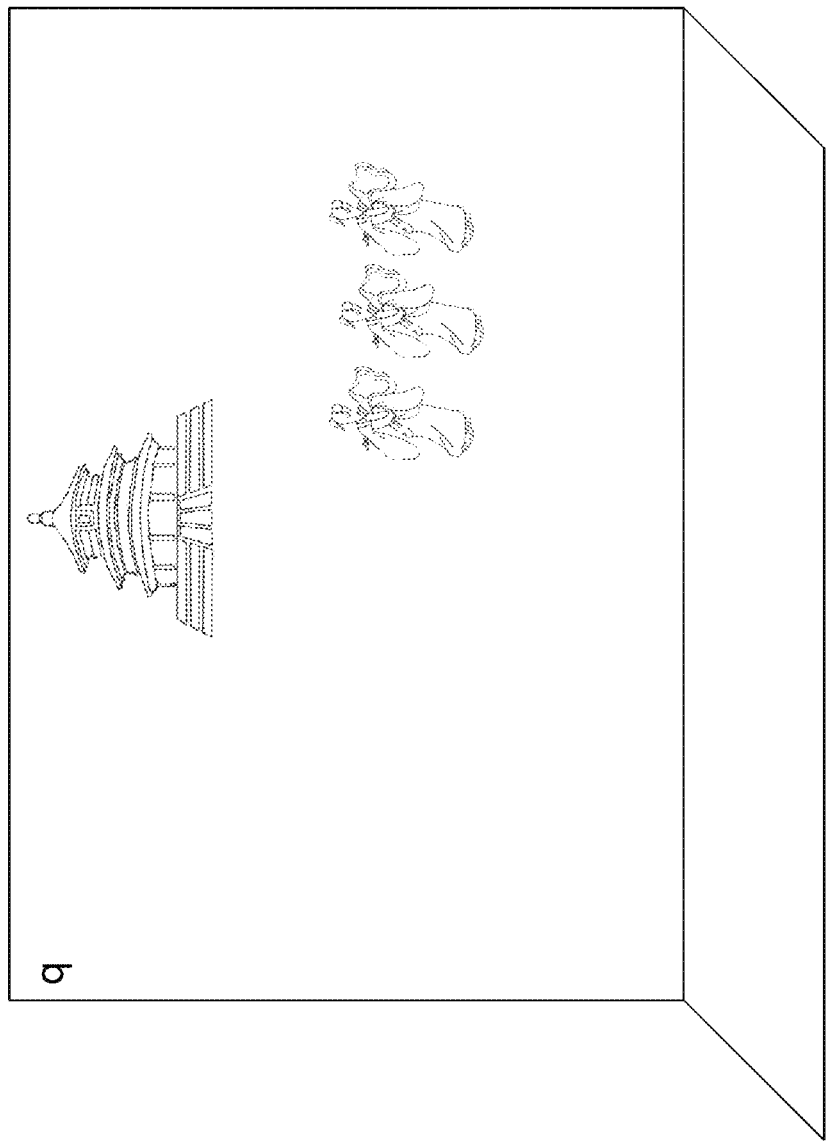
Figure 1q of 3

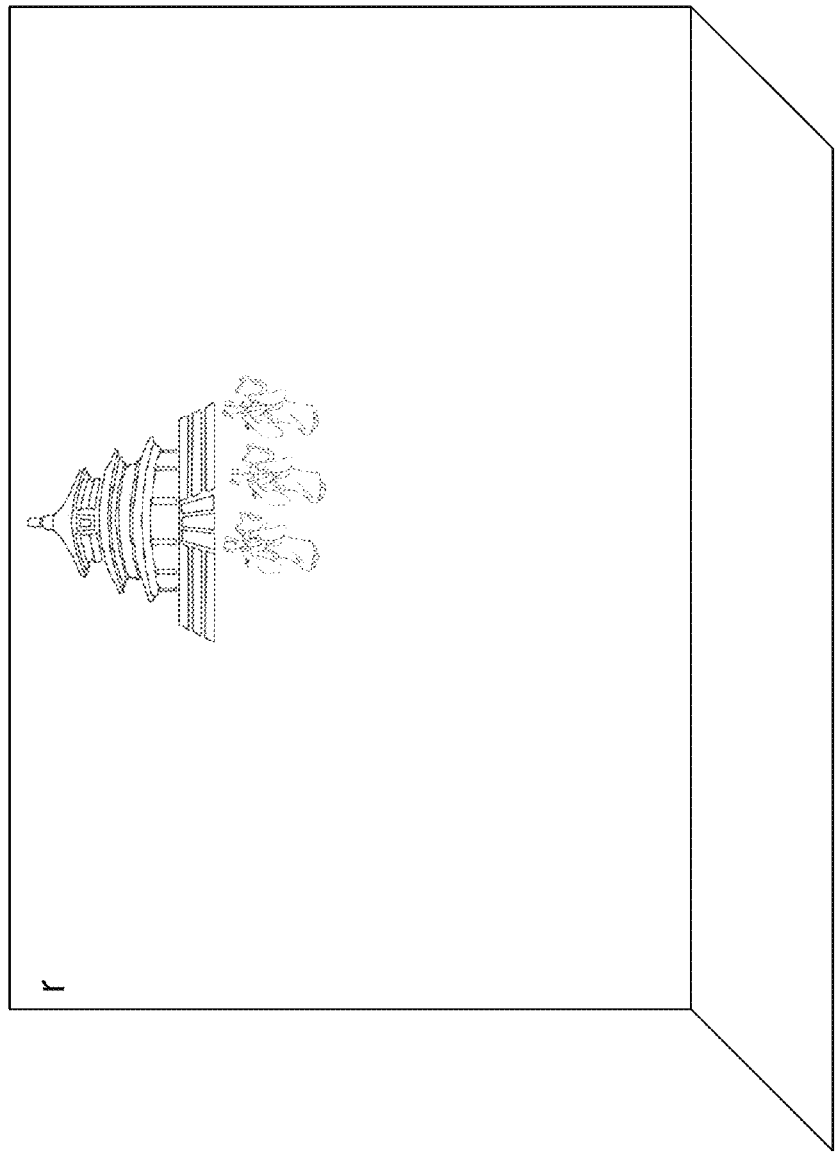
Figure 1r of 3

Figure 2 of 3
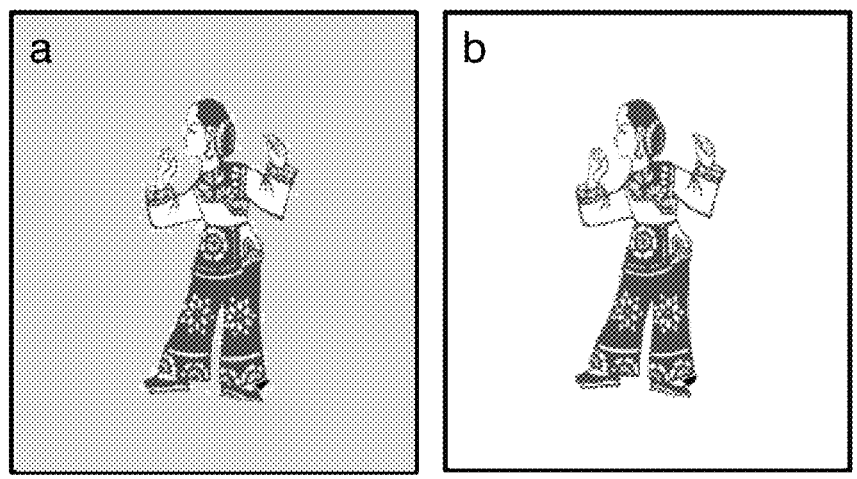
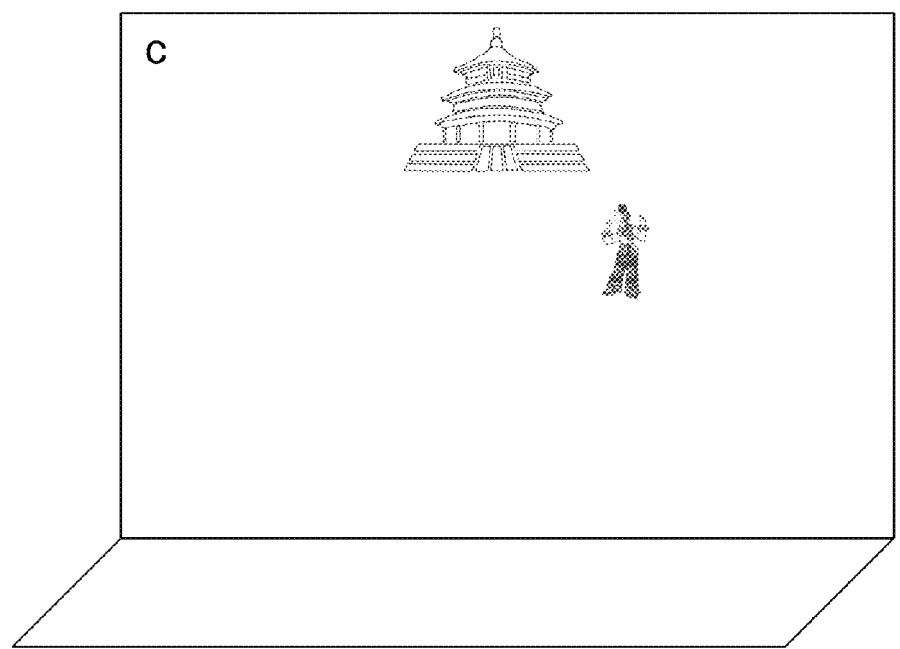

SYSTEM AND METHOD FOR INTEGRATING DIGITAL BACKGROUND WITH STAGE PERFORMANCE

CROSS-REFERENCE TO RELATED APPLICATION

This application is a divisional application of, and claims priority to, U.S. Utility patent application Ser. No. 13/470,044, filed May 11, 2012, which claims priority to U.S. Provisional Patent Application Ser. No. 61/508,016, filed Jul. 14, 2011.

BACKGROUND

In performing arts, live performers, or actors, perform for an audience. In one type of performance, called theatre, the performers enact situations or events for viewing by the audience. The actors are generally in costume and props (physical objects that are part of the performance and in view of the audience) are used to add realism to the performance. Typically, changes in the setting of the performance are implemented by physically changing the actors, costumes and props. If held on a stage, the performance may be called a stage performance.

One type of physical stage used for stage performances has a platform area, which is the surface on which the actors move and perform. The audience is generally located on one or more sides of the platform, often in front of the stage platform. Behind the platform area, and in view of the audience, there is often a stage backdrop. The backdrop may contain illustrations, background landscapes for example, that may add additional realism to the performance. In this way, the backdrop may act as an additional prop on the stage.

Movement of live actors during a stage performance is generally confined to the platform area of the stage, which is in view of the audience. Actors normally move onto and off of the stage by entering or leaving the platform area. Actors can enter or leave the platform from the front (e.g., nearest the audience), from the back (e.g., furthest from the audience), or from the sides. Once actors leave the platform area of a conventional stage, the audience can no longer see them.

In some stage performances, projection screens or video display panels are used as part of the performance. In some cases, digital projection is used. In one example, the screens or panels may be used as a stage backdrop. Generally, the displays on the screens and panels are used as another prop, for example, to display a background or a movie.

BRIEF DESCRIPTION OF THE DRAWINGS

In the accompanying drawings, which are incorporated in and constitute a part of the specification, embodiments of systems and methods for integrating digital background with a stage performance are illustrated which, together with the detailed description given below, serve to describe the examples. It will be appreciated that the embodiments illustrated in the drawings are shown for the purpose of illustration and not for limitation. It will be appreciated that changes, modifications and deviations from the embodiments illustrated in the drawings may be made without departing from the spirit and scope of the invention, as disclosed below.

FIG. 1 illustrates an example of digital images displayed on a stage backdrop sequentially transitioning to live actors on a stage platform (FIGS. 1C, 1D, 1E, 1F, 1G, 1H and 1I). Also illustrated is an example of live actors on a stage platform sequentially transitioning to digital images displayed on a stage backdrop (FIGS. 1J, 1K, 1L, 1M, 1N, 1O and 1P). Also illustrated is an example of change in size of the digital images to simulate a change in distance between the audience and image. In one example, size of the images becomes larger during movement across the stage backdrop, to simulate a decrease in distance between the images and the audience (FIGS. 1A, 1B and 1C). In one example, size of the images becomes smaller during movement across the stage backdrop, to simulate an increase in distance between the images and the audience (FIGS. 1P, 1Q and 1R).

FIG. 2 illustrates an example method for making a digital image of an actor and displaying the image on a stage backdrop. FIG. 2A illustrates an actor performing in front of a blank background. The performance is captured as an image using a video camera.

FIG. 2B illustrates digitalization of the video image. The image may be extracted from the video or the background removed from the video. The image may be incorporated into a background video. FIG. 2C illustrates displaying the extracted image on a stage backdrop.

DETAILED DESCRIPTION

Figure 3:
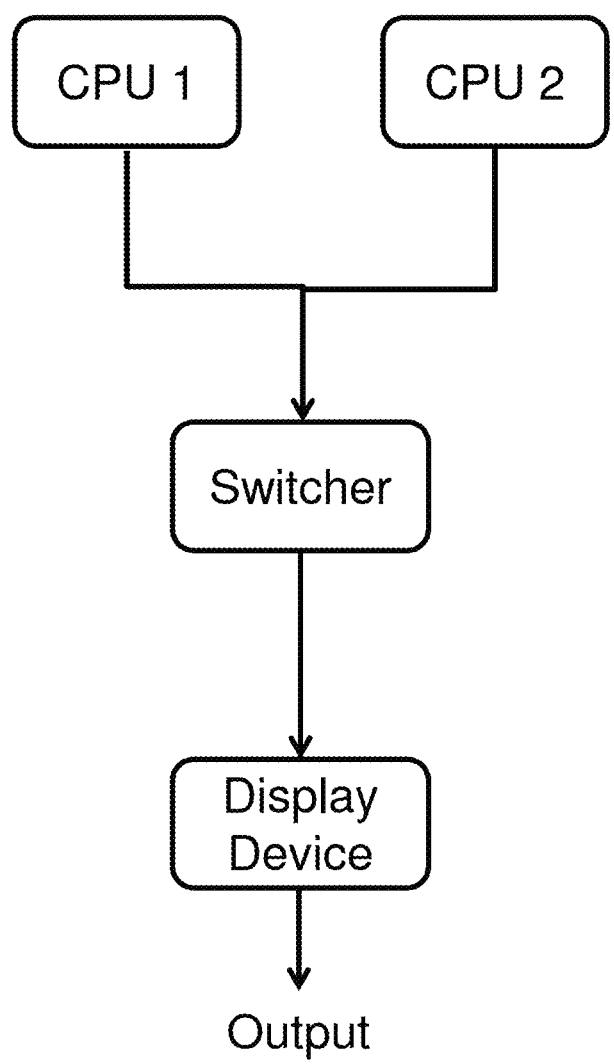
FIG. 3 illustrates an example of a stage performance system. One or more computers are connected to a switcher. Video signals from the switcher are sent to one or more display devices (e.g., projectors or digital display panels).

The discovery disclosed here is that the appearance and movement of images of actors can be integrated and/or coordinated with movements of live actors on a stage in a way that the images appear, to an audience, as lifelike extensions of the live actors. Projection screens or video display panels are used as a stage backdrop to display images of actors. Appearance and movement of the images on the screen or panel displays is coordinated with appearance and movement of live actors on the stage platform such that movement of the images appears as an extension of the movement of the actors. There is a transitioning between images on the stage backdrop and actors on the stage platform and/or between actors on the stage platform and images on the stage backdrop. The transitioning, and coordination of the movements of the images and actors, and/or of the actors and images, before and after the transitioning, expands the apparent range of movement of actors during a stage performance. This disclosure describes systems and methods for integrating a digital background with a stage performance.

In one example, an actor on a stage platform is moving in a direction that will take her off of the stage platform and out of view of the audience. At about the time the actor exits from the stage platform, a lifelike digital image of the actor (e.g., avatar) appears on the screen or panel display. The location on the stage platform where the actor exits, and the location on the stage backdrop where the digital image of the actor appears, are in proximity to one another (the locations are about the same). Exit of the actor from the stage platform and appearance of the image of the actor on the stage backdrop is coordinated in time and space to appear to an audience as a continuous movement of an actor from the stage and onto the display. Once the actor on the stage platform is replaced by the image, movement of the image on the display can continue on the stage backdrop, to expand the apparent range of motion of the actor on the stage, as viewed by the audience.

Movement of live actors off of a stage platform continues, as a lifelike image, onto and across a backdrop. In this example, a live stage actor on the stage moves toward the edge of the stage platform, to a position that cannot be viewed by the audience. As the actor continues her movement and physically leaves the stage platform, out of view of the audience, a lifelike image of the actor appears on the screen. The image first appears on the screen at a location that is generally close to and continuous with the location where the actor exited the stage platform. That is, as the actor leaves the stage platform, her image first appears on the screen in a position that is near to and/or generally continuous with, the location where the actor exited the stage platform. The actor leaving the stage, and the subsequent appearance of the actor's image on the screen at a location near to the location where the actor exited the stage platform, gives the audience the impression that the actor herself has moved from the stage platform to the backdrop. Generally, the movement from stage platform to the backdrop is continuous, uninterrupted and seamless.

In one example, a lifelike image of an actor on a stage backdrop is moving in a direction that will result in the image being located at the edge of the backdrop and, eventually, moving off of the backdrop. At about the time the image exits from the stage backdrop, a live actor appears on the stage platform. The location on the stage backdrop where the image exits, and the location on the stage platform where the actor appears, are in proximity to one another (the locations are about the same). Exit of the image from the backdrop and appearance of the live actor on the stage platform is coordinated in time and space to appear to an audience as a continuous movement of an actor from the backdrop to the stage. Once the live actor replaces the image of the actor on the backdrop, movement of the actor can continue on the stage platform. The visual experience, of the moving image on the stage backdrop merging into a live actor on the stage platform, who continues her movements on the platform, expands the apparent range of motion of the actor on the stage, as viewed by the audience.

A stage backdrop or display panel can portray a lifelike image of an actor. In one example, the backdrop is a screen or display panel. In one example, the image of the actor is a digital image. The image of the actor on the backdrop can be in motion, toward an edge of the backdrop and/or toward the stage platform. As the moving image approaches the edge of the backdrop, it is no longer displayed on the backdrop. At about this moment, a live actor appears on the stage platform, near the location where the image exited the backdrop, and continues her movement on the platform. The transition from the image on the backdrop to the live actor on the stage platform is continuous, uninterrupted and seamless. This is viewed by the audience as a continuous movement of an actor from the digital screen to the stage platform.

As is described herein, a property of the disclosed methods and systems is the transitioning from the live actor(s) on the stage platform to the image(s) of the actor(s) on the display, or the transitioning from image(s) of the actors on the display to the live actor(s) on the stage platform. Generally, this transitioning is coordinated in time so that, at about the moment, or after the moment, a live actor leaves the stage platform, an image of the actor appears on the display. Likewise, at about the moment, or after the moment, an image of an actor leaves the display, a live actor appears on the stage platform. Generally, this transitioning is also coordinated in location so that, an image of an actor appears on the display at a location near to where the live actor exited the stage platform. Likewise, a live actor appears on a stage platform at about the location where the image of the actor disappears from the display.

Generally, the transitioning is also coordinated in movement, which may include direction and speed. For example, the direction and speed of an actor image on a display, that has replaced a live actor on a stage platform, is generally consistent with the direction and speed of the live actor on the stage platform prior to the actor exiting the stage platform. Likewise, the direction and speed of a live actor on a stage platform, that has replaced an image of the actor on a display screen, is generally consistent with the direction and speed of the image on the display prior to the image leaving the display. These properties of coordination in time, space/location and movement, between actor and image or image and actor, contribute to the experience of the audience that the images on the display are an extension of live actors on the stage platform.

Generally, if the transition between stage platform and display screen, or between display screen and stage platform, involves multiple actors or images, the numbers of actors and images are equivalent. For example, if 10 live actors on the stage platform are transitioning from the platform to the screen display, generally 10 of the live actors will, over a period of time, be replaced by 10 equivalent images on the display screen. In one example, the transitioning will occur in a manner where exit of 1 actor from the stage platform will shortly thereafter be replaced by 1 equivalent image on the display screen. In such a transition, the sum of visible actors and visible images generally will generally be 10 at all times. Over time, 10 live actors will become 9 live actors and 1 screen image. Then, the 9 live actors and 1 screen image will become 8 live actors and 2 screen images, and so on. This type of transitioning may be referred to as sequential or consecutive. The reverse—images transitioning to actors—may also occur.

In another example of transitioning involving multiple actors and images, 10 live actors on the stage platform exit the stage platform at the same time and, shortly thereafter, are replaced, at the same time, by 10 images on the stage backdrop. This type of transitioning may be referred to as simultaneous. The reverse—images transitioning to actors—may also occur.

As described, one example of the disclosed systems and methods is transitioning of a live actor on a stage platform to an image of the actor on the screen display. Another example is transitioning of an image of an actor on a screen display to a live actor on the stage platform. In another example, the transitioning from stage platform to display, or from display to stage platform is of a prop that is not a live actor.

FIG. 1 illustrates one example of images of actors on a backdrop or background display moving off of the stage backdrop, toward a stage platform, disappearance or exiting of the images from the display and transitioning of the images to live actors on the stage platform, and then continuation of the movement of the images as actors on the stage platform. The illustrated transitioning is of the sequential type.

FIG. 1 also illustrates movement of images on and/or across a stage backdrop and changing of the size of the images during the movement. The effect is a perception by an observing audience that the distance between the audience and images is changing.

In panels A-G of FIG. 1, images of actors are displayed/visible on a background display. In panels A-C, images of three actors are moving from the top of the display toward the bottom and to the right of the display (the perception of the audience may be that the images are moving through the air or flying toward the stage platform from a distant location). As the images move or change position on the display, the sizes of the images increase. This simulates a change in distance between the images and the audience (e.g., the audience perceives the images to be getting closer).

In panels P-R of FIG. 1, images of the three actors are displayed/visible on the background display and are moving from the bottom right of the display toward the top and to the right of the display. As the images move or change position on the display, the sizes of the images decrease. This simulates a change in distance between the images and the audience (e.g., the audience perceives the images to be getting farther away).

Panels C-I of FIG. 1 illustrate transitioning of images displayed on a background display to actors on a stage platform. During the transition, images of three actors (panel C) exit or leave the background display and three live actors appear on the stage platform (panel I). The transitioning is of the sequential type. The three images (panel C) move toward an edge of the display. One image exits the display, leaving two images on the display (panel D). At about the time, or subsequent to the time, that the one image exits the display, a live actor appears on the stage platform (panel E). In one example, the time duration over which the activities in panels C-E occur may be short, such that the audience does not readily perceive the situation illustrated in panel D, where there are two total figures (two images on the display). Instead, the audience may more readily and/or continuously perceive three total figures (three images on the display as in panel C; then two images on the display and one image on the stage platform as in panel E). The transition continues as a second image exits the display, leaving a single image on the display (panel F). At about the time, or subsequent to the time, that the second image exits the display, a second live actor appears on the stage platform (panel G). Next, the third image exits the display, leaving no images on the display (panel H). At about this time, a third live actor appears on the stage platform (panel I). Generally, during the time duration over which the activities in panels C-I occur, the audience may continuously perceive three total figures (3 images, then 2 images and 1 actor, then 1 image and 2 actors, then 3 actors).

The transitioning between image and actor and/or actor and image generally also has the property of occurring in about the same location. For example, exit of an actor from the right side of the stage may be followed by display of an image of the actor on the right side of the display. The proximity of exit of the actor from the stage platform and initial display of the image on the stage backdrop appears to an audience as a continuous movement of an actor from the stage and onto the display Exiting of actors from a stage platform, or entry to/appearance on the stage platform can occur in various ways. In the example illustrated above, the actors enter and exit the stage platform from a side of the stage platform, where the actors are hidden from view of the audience. One, the other, or both sides of a stage platform may be used in this way. In the illustrated example, the actors exit/enter the stage platform sequentially/consecutively. In other examples, more than one actor may simultaneously exit/enter the stage platform from the sides.

Actors can also exit and enter the stage platform from the front or back of the stage. In one example, one or more flights of stairs may be located at or near the back of the stage platform (near to the backdrop). The one or more flights of stairs may be positioned in a configuration so that an actor may enter the stairs from the stage platform and then exit the stage platform, out of view of the audience. For example, the stairs may be positioned near an edge or end of the stage platform and lead an actor off of the stage platform (e.g., the stairs may lead to a position below the stage platform). Other configurations of stairs are possible. For example, stairs positioned at or near an edge of the stage platform may lead up and then down in order to guide an actor over an edge and off of the stage platform. One (sequential/consecutive) or more than one actor (simultaneous) may exit or enter the stage platform in this way.

After the actor leaves the stage platform using the stairs, an image of the actor may appear on the display screen near the location where the actor exited the stage platform using the stairs. In another example, an image of an actor on a display screen may move toward the stage platform and leave the edge of the display screen near the location where a flight of stairs is located. As the image leaves the display screen, a live actor may enter the flight of stairs, out of the view of the audience and, using the stairs, appear on the stage platform. In an example where multiple flights of stairs are placed at or near the back of the stage platform, multiple actors can simultaneously exit or enter onto the stage platform. In one example, one actor per flight of stairs can simultaneously exit from or enter onto the stage platform.

Alternatively, actors may not enter or leave the stage platform, but may be positioned on the stage platform, out of view of the audience. For example, an actor may use a stage prop, or other part of the stage, to hide herself from the audience. An actor located on the stage platform, but out of view of the audience (e.g., behind a prop), may reveal herself to the audience and appear to enter the stage platform, as an image of the actor disappears from the display screen. An actor located on the stage platform, in view of the audience, may hide herself from the audience, through use of a stage prop, and an image of the actor may appear on the display screen.

Exiting of images from, or appearance of images on, the background display can generally be accomplished using techniques that provide for creation and/or manipulation of images. Some of these methodologies are described below as related to FIG. 2 and FIG. 3.

The transitioning between live actors on the stage and images on the screen, or between images on the screen and live actors on the stage, has a property or characteristic of precision. Generally, precision refers to the similarity in appearance of the actors and images that interchangeably transition between each other. In one example of precision, the visual appearance of the live actors and the paired images is similar or identical. Generally, the costumes of the live actors are the same as the costumes of the images of the actors. The colors of the costumes are the same. In one example, the facial appearance of the images is also very similar or identical to the appearance of the paired live actors. The appearance to the audience is that the actor on the stage and the paired image are the same person. This similarity generally adds to the perception and experience of the audience that images are extensions of live actors.

In one example, this precision can be achieved, in part, due to the methods used to produce the digital image of the actor, and to the methods used to integrate a digital image into the background, and coordination of the digital display and background combination with the live actors on the stage. Some of these methodologies are described below as related to FIG. 2 and FIG. 3.

FIG. 2 illustrates steps in an example method for making a digital image of an actor that is used in conjunction with a live stage actor.

FIG. 2A illustrates a stage element, here an actor, performing in front of a blank or single-color background. The performance is captured/videoed using a video camera. In one example, the video camera is a digital video camera. In other examples, the video camera is not a digital camera. The image may be captured on film. The film image may later be converted to a digital image. The stage actor generally is performing a variety of movements. The movements to be captured using the video camera are planned, based on known movements of the stage actors during the performance and what are the desired movements of images on the stage backdrop. In other words, the movements of the live actor to be captured are planned so that the image of the live actor that is captured during can be used to transition to or from a live actor on the stage platform. The movements emulate actions that the stage element will be performing on the stage backdrop. In one example of this step, the actor whose image is captured during this step is the same actor that will be performing on the stage platform. Generally, a video designer will consider precise body measurements, costume colors, sizes, shapes and curvature, lighting conditions, precise positioning on stage, dance movements at the time of transitioning etc., so that the digitized dancer looks like the on-stage live actor when the latter merges in and out of the screen(s) or video display panel(s). This is the precision of the system and method.

In FIG. 2B, video editing software is used to extract the image(s) of the actor(s), from the image(s) captured using the video camera, digitally onto a computer. Alternatively, it may be that the software is used to remove the single-color background, leaving only the image(s) of the actor(s). If the images of the actor were captured on film, the film images may be converted to digital images.

In one example, the extracted images of the actors may then be incorporated into a background video. The background video contains the extracted image(s) and, when displayed, produces the effects as shown in FIG. 1. This is illustrated in FIG. 2C. In addition to the actors, the background video may contain other background images that represent various props. The extracted images, absent other background images, may also be displayed along with a background video, as described in FIG. 3. Manipulation of the digital images (e.g., digitalizing, extracting, removing background, incorporating into background video, etc.), may use video editing software. Example video editing software may include programs like Final Cut Pro X (Apple Computer), Vegas Pro (Sony), Premier (Adobe), and others. Generally, these programs/software is capable of performing chroma key compositing. Other methods for extracting images and/or combining two or more image elements into a single image may be used. In one example, a non-digital method may be mattes or traveling mattes.

FIG. 3 illustrates an example of a stage performance system. The example system may be used to display the images to obtain the effects shown in FIG. 1. In this example, two different computers (CPU 1 and CPU 2) are shown connected to a video switcher. The video switcher may be connected to a projector or other display device that is capable of displaying images onto a projection screen or display panel. The computers provide input to the video switcher. The video switcher provides output to the display device. Other arrangements of computers, video switchers and display devices may be used.

In one example, CPU 1 may store a background video that contains extracted images of actors, as described in FIG. 2. CPU 2 stores a background video alone (i.e., a background video that does not contain the extracted images of actors). The two computers are operated to provide their output to the video switcher. The output from CPU 1 is the background video that contains extracted images of actors. The output from CPU 2 is the background video alone. Output from these computers may be coordinated to provide the outputs at the desired times. For example, it may be desirable to stop display of background video stored on CPU 1 and start display the background video stored on CPU 2. For example, the output from CPU 2, containing images of actor(s) may be desired at a time when a live actor is entering or exiting the stage platform. At other times, output from CPU 1 may be desired. An operator may determine coordination of output from the computers. One or more computer programs may determine coordination of output from the computers. The video switcher, in part, may also play a role in coordinating computer output. Once the video switcher receives outputs from the computers, the video switcher may select the computer output(s) to give the desired output to the projection screen or display panel.

In another example, one or more sets of computers stores digital images of actors that contain no background. One or more different sets of computers may store a background video. The computers may be operated to provide video output to the video switcher. In this example, the video switcher may have the capability to perform chroma key compositing. In this example, the video switcher is capable of incorporating the images of actors, output from the first set of computers, into the background video, output from the second set of computers. The video switcher may merge the output from the first and second set of computers.

The examples described in this disclosure are for the purpose of illustrating an embodiment and is not to be construed as a limitation.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

I claim:

1. A method for presenting a stage performance, comprising:
    displaying a precision image of a live actor on a stage backdrop; and
    moving the precision image on the stage backdrop in a direction to exit the stage backdrop;
    where, at about the time the precision image exits the stage backdrop, a live actor is displayed on a stage platform in the general location where the precision image exited the stage backdrop.

2. The method of claim 1, where the live actor displayed on the stage platform, moves on the stage platform in a direction and at a speed that is coordinated with prior movement of the precision image on the stage backdrop.

3. The method of claim 1, where one of the precision image or the live actor is visible to an audience at one time, and the other is not visible, and where there is a transitioning between visibility to the audience from the precision image to the live actor.

4. The method of claim 1, where the precision image is similar or identical in appearance to the live actor.

5. The method of claim 4, where similar or identical in appearance means one or more of, the costumes of the precision image and the live actor are the same, the costume colors of the precision image and the live actor are the same, and the facial appearances of the precision image and the live actor are the same.

6. The method of claim 4, where similar or identical in appearance means that the appearance to an audience is that the precision image and the live actor are the same person.

7. The method of claim 1, where while moving the precision image on the stage backdrop, the precision image changes size to simulate a change in distance between an audience and the precision image.

8. The method of claim 7, where size of the precision image becomes larger as it moves to exit the stage backdrop, to simulate a decrease in distance between the audience and the precision image.

9. A method for presenting a stage performance, comprising: displaying a precision image of a live actor on a stage backdrop at about the time a live actor exits a stage platform and in the general location where the live actor exits the stage platform; and moving the precision image on the stage backdrop in a direction and at a speed that is coordinated with prior movement of the actor on the stage platform.

10. The method of claim 9, where one of the live actor or the precision image is visible to an audience at one time, and the other is not visible, and where there is a transitioning of visibility to the audience from the live actor to the precision image.

11. The method of claim 9, where the precision image is similar or identical in appearance to the live actor.

12. The method of claim 11, where similar or identical in appearance means one or more of, the costumes of the precision image and the live actor are the same, the costume colors of the precision image and the live actor are the same, and the facial appearances of the precision image and the live actor are the same.

13. The method of claim 11, where similar or identical in appearance means that the appearance to an audience is that the live actor and the precision image are the same person.

14. The method of claim 9, where while moving the precision image on the stage backdrop, the precision image changes size to simulate a change in distance between an audience and the precision image.

15. The method of claim 14, where size of the precision image becomes smaller as it moves on the stage backdrop, to simulate an increase in distance between the audience and the precision image.

16. A method for presenting a stage performance, comprising: displaying a precision image of a live actor on a stage backdrop; moving the precision image on the stage backdrop in a direction to exit the stage backdrop; and exiting the precision image from the stage backdrop in the general location where a live actor appears on a stage platform and at about the time when the live actor appears and moves on the stage platform; where moving of the precision image on the stage backdrop is coordinated in direction and speed with movement of the live actor on the stage platform.

17. The method of claim 16, where the precision image is similar or identical in appearance to the live actor.

18. The method of claim 17, where similar or identical in appearance means the costumes of the precision image and the live actor are the same, the costume colors of the precision image and the live actor are the same, and the facial appearances of the precision image and the live actor are the same.

19. The method of claim 18, where similar or identical in appearance means that the appearance to an audience is that the precision image and the live actor are the same person.

* * * * *